(12) United States Patent
Scarborough et al.

(10) Patent No.: US 6,353,448 B1
(45) Date of Patent: Mar. 5, 2002

(54) GRAPHIC USER INTERFACE DISPLAY METHOD

(75) Inventors: Jerry Scarborough, Lake Wales; Matthew C. Scarborough, Tampa; Bradley J. Florin, St. Petersburg, all of FL (US)

(73) Assignee: EZ Online Network, Inc., Tampa, FL (US)

( * ) Notice: Subject to any disclaimer, the term of this patent is extended or adjusted under 35 U.S.C. 154(b) by 0 days.

(21) Appl. No.: 09/571,972

(22) Filed: May 16, 2000

(51) Int. Cl.[7] .................................................. G06F 3/00
(52) U.S. Cl. ........................ 345/744; 345/762; 345/838; 709/219
(58) Field of Search ................................. 345/333, 357, 345/339, 334, 329, 335, 428, 431, 432, 762, 764, 854, 733, 744, 589, 838, 835, 810; 709/203, 219; 707/501, 513, 104

(56) References Cited

U.S. PATENT DOCUMENTS

| | | | |
|---|---|---|---|
| 5,761,655 A | | 6/1998 | Hoffman |
| 5,911,139 A | | 6/1999 | Jain et al. |
| 5,963,964 A | * | 10/1999 | Nielsen et al. ............... 707/501 |
| 6,011,537 A | | 1/2000 | Slotznick |
| 6,031,989 A | * | 2/2000 | Cordell ....................... 707/513 |
| 6,041,143 A | | 3/2000 | Chui et al. |
| 6,091,411 A | * | 7/2000 | Straub et al. ................ 345/747 |
| 6,181,342 B1 | * | 1/2001 | Niblack ....................... 345/356 |
| 6,185,585 B1 | * | 2/2001 | Sequeira ..................... 707/513 |
| 6,199,106 B1 | * | 3/2001 | Shaw et al. .................. 709/217 |

OTHER PUBLICATIONS altavista: Business Solutions, http://doc.altavista.com/business_solutions/search_link/hosted.html, May 10, 2000.
Technology Prior Art Serch, iGlacier, Inc., Micromedia Site of the Day, http://www.grokbot.com/grokbotine.html, Apr. 4, 2000.
Technology Prior Art Search, iGlacier, Inc., http://www.cs/yale.edu/~freeman/MEME/, Apr. 4, 2000.
Technology Prior Art Search, iGlacier, Inc., http://www.c-s.yale.edu/~freeman/MEME/interface.gif, Apr. 4, 2000.
Technology Prior Art Search, iGlacier, Inc., Current Applications, http://www.cse.ucsc.edu/~markb/Proposal/applications.html, Apr. 4, 2000.
Technology Prior Art Search, iGlacier, Inc., A Visual Approach to Multimedia Querying and Presentation, http://www.uni–mannheim.de/acm97/papers/cruz/mm97html.html, Apr. 4, 2000.

* cited by examiner

*Primary Examiner*—John Cabeca
*Assistant Examiner*—Kieu D. Vu
(74) *Attorney, Agent, or Firm*—Anton J. Hopen; Smith & Hopen, P.A.

(57) ABSTRACT

A method of displaying graphic user interface layouts including the steps of accessing a data repository storing an instruction set for constructing a graphic user interface layout through a network connection, rendering the graphic user interface layout associated with the instruction set and reducing the graphic user interface layout to a bitmap image. Once the graphics and text are laid out, the screen display is reduced to a bitmap image and associated with a uniform resource locator string. When a search query that retrieves the uniform resource locator string, the bitmap image and the uniform resource locator string are displayed to the end-user. As an alternative to displaying the actual text of the resource locator string, it may be embedded as an image hyperlink.

7 Claims, 10 Drawing Sheets

PRIOR ART

GRAPHIC USER INTERFACE DISPLAY METHOD

FIELD OF INVENTION

The present invention relates generally to a method of displaying graphic representations of another graphic user interface in response to a query, and more particularly to a method for retrieving data relating to a graphic user interface, rendering the graphic user interface and, capturing the rendered image to a bitmapped file for display.

BACKGROUND OF THE INVENTION

A website is typically a collection of text and graphics residing on a computer accessible over a wide area network (herein "WAN"). Websites might also include sound and animation files. These files are then displayed in a predetermined configuration by a client-side application called a web browser. In theory, the screen layout of the text, graphics, sound and animations of a particular website is the same regardless of what type of browser is used. The dominant browsers currently available are the Internet Explorer® distributed by the Microsoft Corporation and the Netscape Navigator® distributed by the Netscape Corporation. Although standards have been propagated, relatively minor inconsistencies exist between each browser. These inconsistencies will only compound with the introduction and proliferation of portable devices that access the Internet through wireless connections. Cellular telephones and hand-held devices such as Palm, Inc.'s Palm Pilot VII® have access to some websites although physical limitations in the devices severely restrict their ability to display screen layouts to those viewed by Internet Explorer and Netscape Navigator. Improving screen displays has been a critical feature of current research and development into the portable devices for it is the graphic user interface that is displayed to the end-user.

In the early 1990s, websites were largely text-based. As a communication medium, they competed with modem-operated bulletin board system that were even further restricted to the ANSI character set. This produced a graphic user interface that was severely restricted in creativity and unique look and feel. As the hypertext markup language standard for website layouts continued through the 1990s, tables, textures, cascading style sheets, and even dynamically created content emerged, websites took on more aesthetic freedom and every website had the ability to look unique. However, until the late 1990s, the vast majority of end-user access to remote websites was through a modem connection at speeds from 9,600 bits per second to 56,000 bits per second. Compared to a typical low-end local area network connection (here "LAN") of 10,000,000 bits per second, modems forced website designers to pay close attention to how much graphics, sound and animation they could include on their website pages. If too much content required transmission over the modem connection, end-users would lose their patience and move on to another website that loaded quickly. Accordingly, compressed graphic formats such as the JPEG (ISO standard 10918) became a fundamental tool in creating quick-loading websites. The bandwidth problem even forced many website developers to provide a "text only" copy of the website for end-users with slow connections.

However, with the recent introduction of higher-bandwidth connections for the end-user, website developers have much more freedom to include graphically rich content. Digital subscriber lines (herein "DSL") can carry data over ordinary copper telephone lines at a theoretical maximum bandwidth of 8,448,000 bits per second. Cable modems, which utilize the large copper coaxial cable that delivers television programming transmits data up to nearly 30,000,000 bits per second. Accordingly, with such bandwidth, graphic user interface design is freed from earlier bandwidth constraints and therefore may be much more graphically rich. Because the graphic user interface is so important, a number of advances have occurred in website development tools. graphic user interface layout tools such as Microsoft's FrontPage®, Macromedia's Deamweaver®, Adobe System's Pagemill® and the like have dramatically lowered the learning curve for developers to produce and maintain graphically rich websites.

Search engine technology has continued to progress at a fast pace in recent years. Driven by the fuel of electronic commerce, search engines are a major starting point for end-users wishing to find products, services and information relating to their particular interest. Search engine innovations have included advances in query construction, sorting algorithms, and filtering out unwanted content. However, search engines produce relatively simple text display results. There are at least two inherent limitations in this approach. First, the end-user is assumed to have the language ability to read and understand the text display. Although language translation features for search engines are notoriously well known, many languages are not heretofore provided. Furthermore, some languages, such as Chinese, Korean, and Japanese characters are difficult to interpret correctly. Accordingly, the end-user is left to guess at what content might lie on the other side of the hyperlink.

A second limitation in the traditional approach is that the simple text listing produced by a search engine is not indicative of the quality, sophistication, and/or artistry of the linked website. As noted above, graphically rich graphic user interfaces are more common and many well-known sites have a consistent look and feel throughout all the pages in their sites. Upon viewing the first page of a website (often referred to as the "home page"), most users will determine whether they want to continue to explore that particular website or move on to another site. However, to do this, they must leave the search engine website, wait for the selected site to load and then view of the graphic user interface layout and/or associated content to determine whether they want to continue. Although the adage "never judge a book by its cover" may apply to this scenario, all too often an end-user will base his or her decision to explore a website on the aesthetic qualities of the website graphic user interface. Unfortunately, current search result listings provide no information on the graphic user interface associated with the target website.

Another trend in current technology is the emergence of the "wireless Internet." Small communication devices such as wireless telephones and personal digital assistants such as the Microsoft Pocket PC and Palm, Inc.'s Palm Pilot VII have unique display limitations. Standards for the dissemination of information to these devices such as the Bluetooth standard aim to assist in the integration of these new devices into current information pathways. However, from the graphic user interface design point of view, multiple standards lead to new compatibility problems. For example, a well-accepted minimum resolution for personal computers is 680 pixels in width by 480 pixels in height. Accordingly, many website designers restrict the maximum dimensions of their website with that resolution in mind. Advances in browser technology have allowed the end-user's client-side browser application to pass on the end-user computer's display resolution. Many web servers are able to read this information and dynamically adjust the content to the end-user's resolution or redirect the end-user's browser to a separate set of pages geared towards higher resolutions such as 800 width by 600 height or 1024 width by 768 height. However, as emerging standards proliferate, it becomes increasing difficult to adapt common graphic user interface design to multiple platforms.

U.S. Pat. No. 6,041,143 to Chu et al. describes a multi-resolution image processing system wherein images are initially stored in files that contain thumbnail data, as well as full image data structure (Col. 1, lines 63–65). Chu et as. stores only the thumbnail data and the full image data in a image file. Intermediate sized images, as those needed for zooming in on a field of interest, are more quickly calculated using images data structures. (Col. 2, lines 21–24). Accordingly, rendering speed and storage requirements are reduced for the intended application. (Col. 2, lines 24–25). However, Chu et al. does not disclose, teach or suggest a method of producing a representative image of a website graphic user interface upon a search engine query.

U.S. Pat. No. 5,911,139 to Jain et al. describes an extensible system for retrieval of stored visual objects based on similarity of content to a target visual object. In other words, the Jain et al. provides a searchable database for images wherein the user can search by hue, saturation, texture, randomness, shapes and other visual attributes that can be automatically interpreted by a computer means. (Col. 4, lines 2–6). However, it does not provide for the novel technique of capturing small visual representations of web pages, reducing them to sizes and color depths that transmit quickly, and displaying them through a visual search engine.

U.S. Pat. No. 5,761,655 to Hoffman describes a system which stores, retrieves and displays thumbnails of images with the dominant colors displayed in the thumbnails. (Col. 4, lines 8–10) However, Hoffman does not describe, teach or suggest the generation of thumbnails based on website screen layouts.

U.S. Pat. No. 6,011,537 to Slotznick describes a method of displaying primary and secondary information on a graphic user interface. The system may be implemented in an Internet environment wherein the primary and secondary information are retrieved from one or more remote websites to best utilize bandwidth and increase the perceived speed at which information is gathered and presented to the end-user. (Col. 4, lines 62–64). The method is most clearly understood as follows: (1) secondary information is downloaded and stored in fast memory, while primary information is experienced; (2) secondary information is fully or partially hidden until triggered; (3) secondary information is triggered and displayed as if it were a separate page; (4) secondary information is triggered not only by hypertext, icons, controls and thumbnail images, but also by keyhole images; and (5) secondary information is also displayed automatically as a trailer while new primary information is retrieved or while the user is logging off. (Col. 11, lines 12–21). Claim seven of the Slotznick patent describes displaying a thumbnail image of the secondary information as a portion of secondary information which is simultaneously displayed with the primary image. (Col. 41, lines 66–67 to col. 42, lines 1–2). However, Slotznick does not disclose, teach or suggest the generation of thumbnail images based on website screen layouts.

Website reference <www.grokbot.com/grokbotine.htm> describes an objective of creating a search engine that utilizes images to build a query and return images as search results which link to information on the corresponding website. However, beyond the stated objective, no information is provided to enable someone skilled in network search and query design to achieve the above-mentioned objective without undue experimentation. Furthermore, it is unclear from the objective whether this search engine is entirely image based, or whether it is, as the current invention, founded on text searching, but presenting representative graphic user interface layouts.

Website reference <www.cs.yale.edu/~freeman/MEME> describes an indexing system for documents which may include pictures, audio, movies, word documents and the like. However, nothing in this reference suggests rendering a graphic user interface layout for display in query results.

Website reference <www.cse.ucsc.edu/~markb/Proposal/applications.html> describes a "zooming web browser" wherein multiple pages and the links between them are depicted on a large zoomable information surface. Pages are scaled so that the page in focus is clearly readable with connected pages shown at smaller scales to provide context. Another application "pad++" permits website pages to remain visible at varying scales while they are not specifically being visited, so the view may examine many pages at once. However, the abovementioned website reference does not disclose, teach or suggest how rendered images of website graphic user interface layouts are displayed in response to a query.

Website reference <www.uni-mannheim.de/acm97/papers/cruz/mm97html.html> describes a framework for querying and presenting multimedia data stored in distributed data repositories, including the WWW. The reference suggests using thumbnail views of each page to provide an overview of an entire document. The data structure is predefined to have a text icon, an image icon and an audio icon. However, the rendering and of graphic user interface layouts is not disclosed or suggested by this reference.

SUMMARY OF THE INVENTION

The present invention solves significant problems in the art by providing a method of displaying graphic user interface layouts comprising the steps of accessing a data repository storing an instruction set for constructing a graphic user interface layout through a network connection. The instruction set is typically the notoriously wellknown hypertext markup language but may include Standard Generalized Markup Language ("SGML"), Extensible Markup Language and other standards that specify graphic user interface layouts. The data repository may be located on a local area network ("LAN"). However, in most cases it will be located on a global wide area network (i.e., the Internet).

The next step is to render the graphic user interface layout associated with the instruction set and reduce the graphic user interface layout to a bitmap image. For example, in the case of hypertext markup language, a "<p>" tag indicates a paragraph break, a "<br>" tag indicates a carriage return, a "<h1>" indicates that the text should be formatted to a large heading.

Once the graphics and text are laid out, the screen display is reduced to a bitmap image and associated with a uniform resource locator string (e.g., <www.xyz.com>). When a search query that retrieves the uniform resource locator string, the bitmap image and the uniform resource locator string are displayed to the end-user. As an alternative to displaying the actual text of the resource locator string, it may be embedded as a hyperlink. For example: <a href=<www.xyz.com.>>img border="0" src=<xyzcom.gif>width "320"height="240"></a>

Two of the most popular graphic formats on the web are GIF and JPEG. JPEG is preferable for high-color depth. However, by reducing the number of colors in the color table in a GIF file, the size of the file is greatly reduced and thereby provides for a faster loading graphic. Reducing an image to GIF presents several options. First, the image may be exactly reduced to 256 colors. However, the resultant GIF file will be large and slow to download. A better method is to adaptively reduce the image colors, preferably to less than 64 colors depending on the quality of image desired. Adaptive reduction creates a color table by sampling colors from the more commonly used areas of the color spectrum that appears in the image. For example, if a red, green and blue ("RGB") image that has only the colors green and blue, the resulting color table is made up primarily of green and blue colors. Because the colors in most images are concentrated in particular areas of the spectrum, this table can be useful. Some bitmap images are easily readable at 16 colors which creates a very fast loading graphic.

To provide flexibility to the end-user, a preferred embodiment of the invention adaptively reduces the color depth of the hitmap image to a plurality of levels and stores a copy of the bitmap image at each color depth level on a network accessible storage means or in a network accessible database. Such a storage means may include any type of media able to record binary information, but is anticipated to be on hard drive accessible by web servers such as Microsoft's IIS, Apache, or the like. Ultimately, the color depth level of the bitmap image displayed in the search query is predetermined by an end-user color depth setting. These settings may be manually selected upon each search instance or may take the form of a cookie, session variable or record stored in a database table.

In addition to the color depth of a bitmap file, the resolution of the bitmap file also greatly affects the speed at which the end-user may view the information. Accordingly, the present invention resizes the bitmap image to a predetermined resolution. During the resizing process, it is preferable to maintain the aspect ratio of the original bitmap file. As an alternative to resizing to a particular resolution, the original bitmap image may be reduced by both size and color depth to a target file size. This permits consistency in the speed upon which the graphics are displayed. Similar to end-user color depth selection, a preferred embodiment may be provided wherein the bitmap image is resized to a plurality of resolutions and a copy of the bitmap is stored at each resolution on a network accessible storage means. The resolution of the bitmap image displayed in the search query is predetermined by an end-user resolution setting which, similar to color depths, may be manually selected upon each search instance or may take the form of a cookie, session variable or record stored in a database table.

In a preferred embodiment of the invention, an existing content index is accessed such as AltaVista® Hosted Search Services which return search results in Extensible Markup Language. Parallel processing retrieves the hypertext markup language and associated images from the web pages that resulted from the search. The hypertext markup language page and images are reduced into a thumbnail view at various resolutions and color depths.

The invention necessarily requires reliable, high-bandwidth connections. Generally speaking, bandwidth is directly proportional to the amount of data transmitted or received per unit time. In a qualitative sense, bandwidth is proportional to the complexity of the data for a given level of system performance. For example, it takes more bandwidth to download a photograph in one second than it takes to download a page of text in one second.

High bandwidth connections are required for both the connection to the context index and to the target web page for imaging into a bitmap. To enhance efficiency, the bitmap image and the uniform resource locator string are cached on a network accessible storage means. However, this caching of the data is best implemented by caching a plurality of bitmap images on the network accessible storage means or in a network accessible database according to a caching algorithm based on the most popular associated uniform resource locator strings displayed. In addition it is preferred that the caching algorithm purge bitmap images from the network accessible storage means that are infrequently displayed.

A bookmark is a saved link to a web page that has been added to a list of saved links. When an end-user is looking at a particular website or web page and wants to be able to quickly get back to it later, they can create a bookmark for it. The term "bookmark" is used in the Netscape Navigator browser while Microsoft's Internet Explorer uses the term "favorite." Much in the same way that text-based search results are improved by applicant's novel invention, bookmark listings may also benefit from a visual approach.

A bookmark embodiment of the invention comprises the steps of accessing a data repository storing an instruction set for constructing a graphic user interface layout through a network connection, rendering the graphic user interface layout associated with the instruction set, reducing the graphic user interface layout to a bitmap image, associating a uniform resource locator string with the data repository and the bitmap image, and saving the bitmap image and the uniform resource locator string to an enduser bookmark file on a network accessible storage means wherein an end-user may record preferred uniform resource locator strings to the end-user bookmark file for later retrieval and display.

Free online e-mail services such as Yahoo® Mail, Hotmail® and Excite® Mail are highly popular for their cost (usually free) and for the end-user's ability to access their email from any Internet-connected computer. In fact, virtually every major portal offers some form of free email services. For several years now, email has been viewable in hypertext markup language and rich text format which provide layout instructions and can even display graphics within the message. In addition, email addresses usually have a "from" field or "reply to" field which indicates the email address of the sender. Within that email address is the second-level domain name (i.e., <sender@xyz.com>). In most, but not all cases, querying <www.xyz.com> will produce a web page. Accordingly it is an alternative embodiment of this invention to render the layout of the email should it contain more than simple ASCII text, or, in the alternative, render the website of the second-level domain name of the sender's email address.

The above-mentioned embodiment of the present invention comprises the steps of accessing a data repository storing an email associated to an end-user, rendering the email according to a preselected format, reducing the email to a bitmap image, linking the bitmap image to the email, and displaying is bitmap image to the end-user. Preferably, the message is first analyzed to determine whether more than simple ASCII text characters are included in the message before such rendering it attempted. Layout instructions are usually sent as attachments to a text message, whether HTML, GIF, JPEG or other file types.

Rendering is preferred wherein the layout instructions attached to, or contained within the email contains one or more hypertext markup language tags, rich text format tags, or image references. Should only ASCII text characters appear in the message body, or if the system administrator or end-user so chooses, the second-level domain name of the sender's email address is obtained to construct a graphic user interface layout which is then reduced to a bitmap image. The bitmap image may be displayed with the subject string of the message, the sender's email address, the time-date string indicating when the message was sent or received, or any combination thereof.

In an alternative embodiment of the invention, multiple display interface standards may be compared to each other based on common content. This is particularly useful for designing websites that have a consistent "look and feel" across multiple browsers and platforms. For example, certain websites advertise they are "AOL friendly" which refers to America Online®'s internal software browser which sometimes displays content different that other browsers. In addition, with the proliferation of "Internet appliances" that are scaled down devices when compared with the traditional personal computer, establishing a common content appearance is more difficult than ever. Website designers often maintain copies of different versions of web browsers to test their content layout for consistency. For example, they may have copies of Microsoft's Internet Explorer, Versions 3, 4 and 5 as well as multiple versions of America Online's software and Netscape's browsers. This testing is tedious and inefficient as each browser must be loaded and unloaded to view the content.

To assist in the development and validation of multi-platform and multi-standard website layouts, this embodiment comprises the steps of storing a plurality of rendering algorithms each associated with a predefined graphic user interface standard, accessing a data repository storing an instruction set for constructing a graphic user interface layout through a network connection, rendering an image of the graphic user interface layout associated with the instruction set for each of the plurality of rendering algorithms, reducing the image of the graphic user interface layout to a bitmap image, and displaying the bitmap image for each of the plurality of rendering algorithms. A preferred embodiment of the invention includes the step of providing an end-user selection means to control which of the predefined graphic user interface standards is applied to the instruction set and ultimately displayed as the bitmap image wherein the end-user selection means is multi-selection capable thereby allowing multiple bitmap images to be compared against each other.

In another implementation of the above-mentioned embodiment the predefined graphic user interface standard applied is determined by the end-user's browser identification. For example, if the value for "HTTP_USER_AGENT" received the web server is "MSIE," then the end-user's browser is Microsoft's Internet Explorer. Accordingly, bitmap images are rendered according to the specifications of that browser.

Alternatively, if the value for "HTTP_USER_AGENT" is "Mozilla," then the end-user's browser is probably Netscape's Navigator and bitmap images are presented that were rendered according to Netscape's specifications.

Accordingly, it is an object of the present invention to provide a method of visually presenting search results based on the graphic user interface of the corresponding destination.

It is another object of the present invention to provide a method of visually presenting the contents of web-based email messages, particularly when they are formatted with hypertext markup language.

It is another object of the present invention to provide a method of visually presenting an image of the second-level domain website associated with the sender of an email.

It is another object of the present invention to assist in the development of cross-platform and cross-specification website design by display or more bitmap images of the content for each platform and/or specification.

An advantage of the invention is that end-users may quickly determine whether they wish to visit a particular website listed of a website query based on the graphic user interface of the website.

Another advantage of the invention is that content-rich electronic mail may be easily previewed on web-based electronic mail systems.

Another advantage of the invention is that website designers who traditionally needed to keep multiple copies of different web browsers on their computers can simply test the layout of their content through a single interface.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 2:
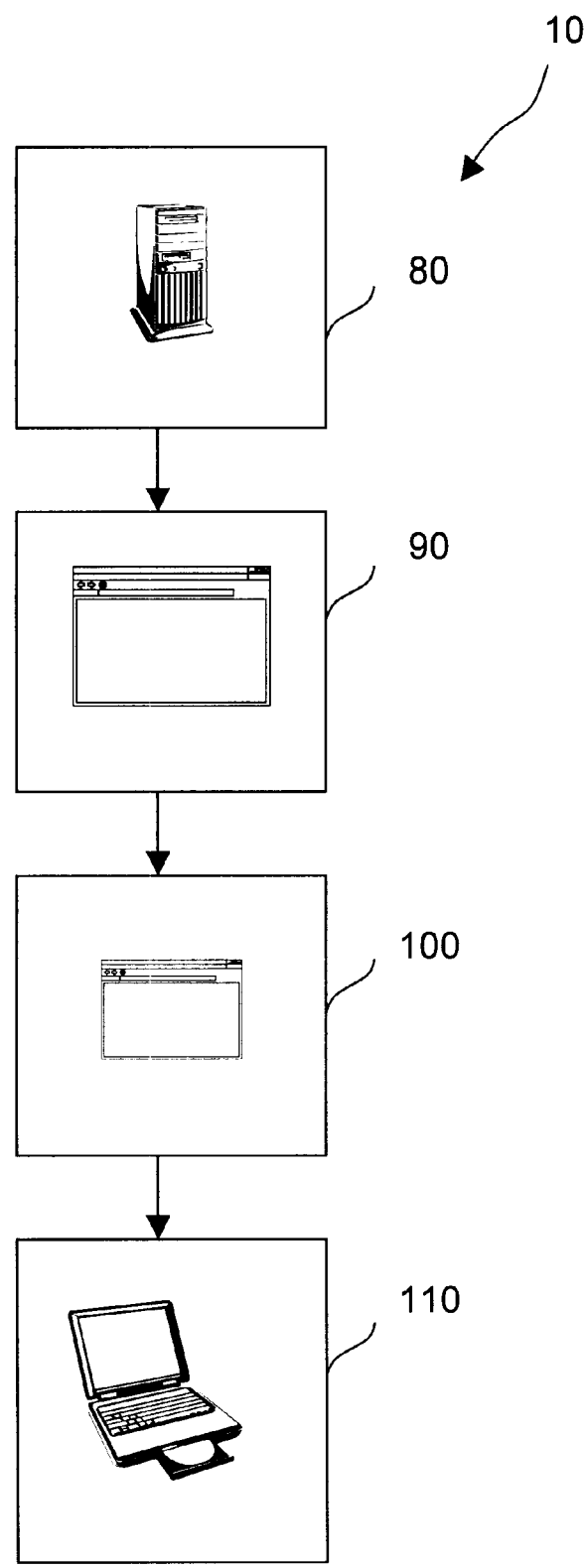
FIG. 2 is a diagrammatic view the core process of the current invention.

Referring initially to FIG. 2 it will there be seen that an illustrative embodiment of the present invention is denoted by the reference number 10 as a whole.

Figure 1:
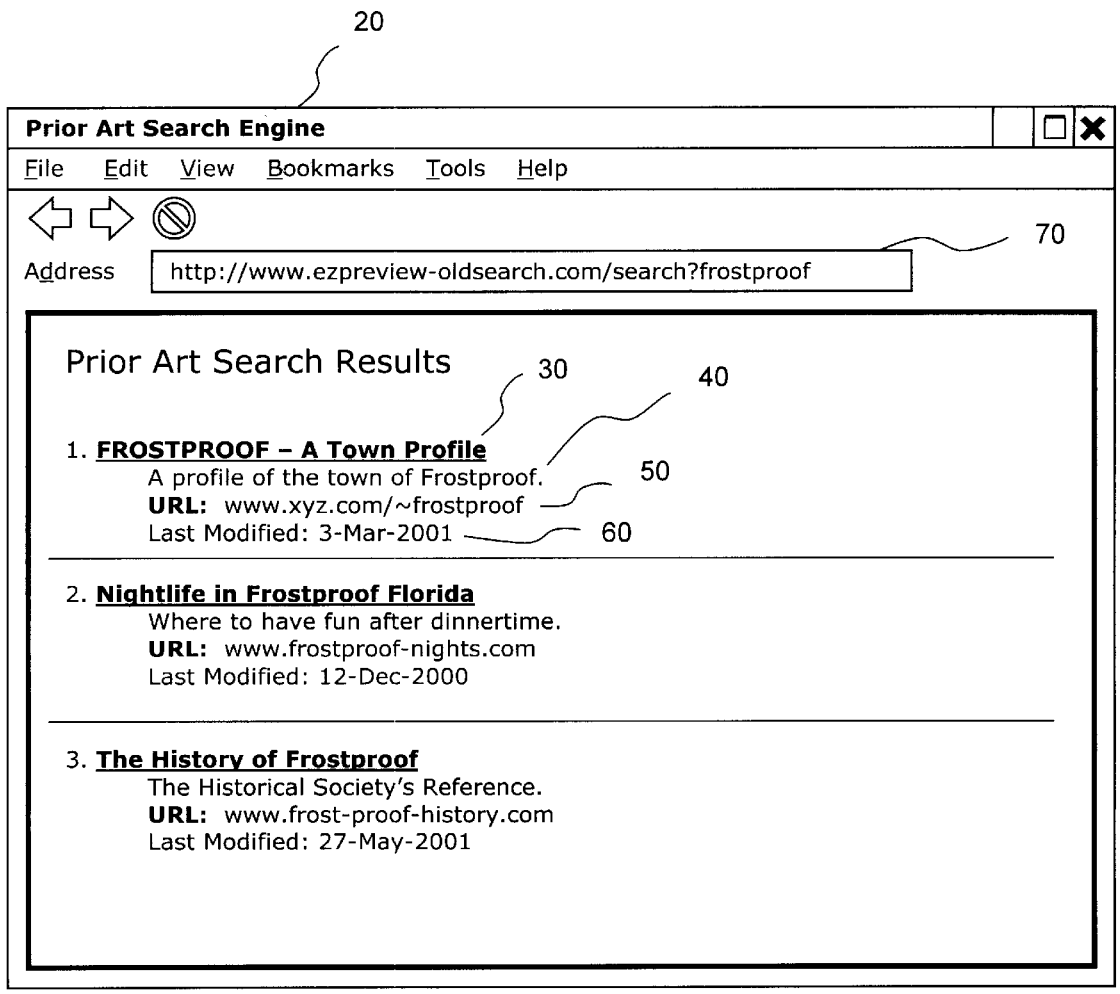
FIG. 1 is an exemplary screen display of the prior art.

FIG. 1 exemplifies the prior art in current search engine result displays. A generic browser 20 is presenting displaying a hyperlink 30 to a destination website. Typically, when the end-user moves his or her mouse over the hyperlink 30 and depresses a mouse button, the destination website is retrieved in the end-user's browser 20. Search results often include a body text string 40 representative of a preselected string within the body of the destination website. The uniform resource locator 50 is displayed along with a last modified date 60 to enable the end-user to determine how recent the information on that website might be. However, the end-user must individually visit each site to compare the aesthetic and functional elements of each graphic user interface. An address field 70 of a website is displayed where a specific Internet address may be keyed in.

In FIG. 2, a data repository 80 is queried through a network connection for text, images and an instruction set, such as hypertext markup language tags, for constructing a graphic user interface layout. The layout is rendered 90 and then reduced to a bitmap image 100 and associated with the uniform resource locator of the data repository 80. The bitmap image 100 and uniform resource locator string is then displayed 110 in response to a search query.

Figure 3:
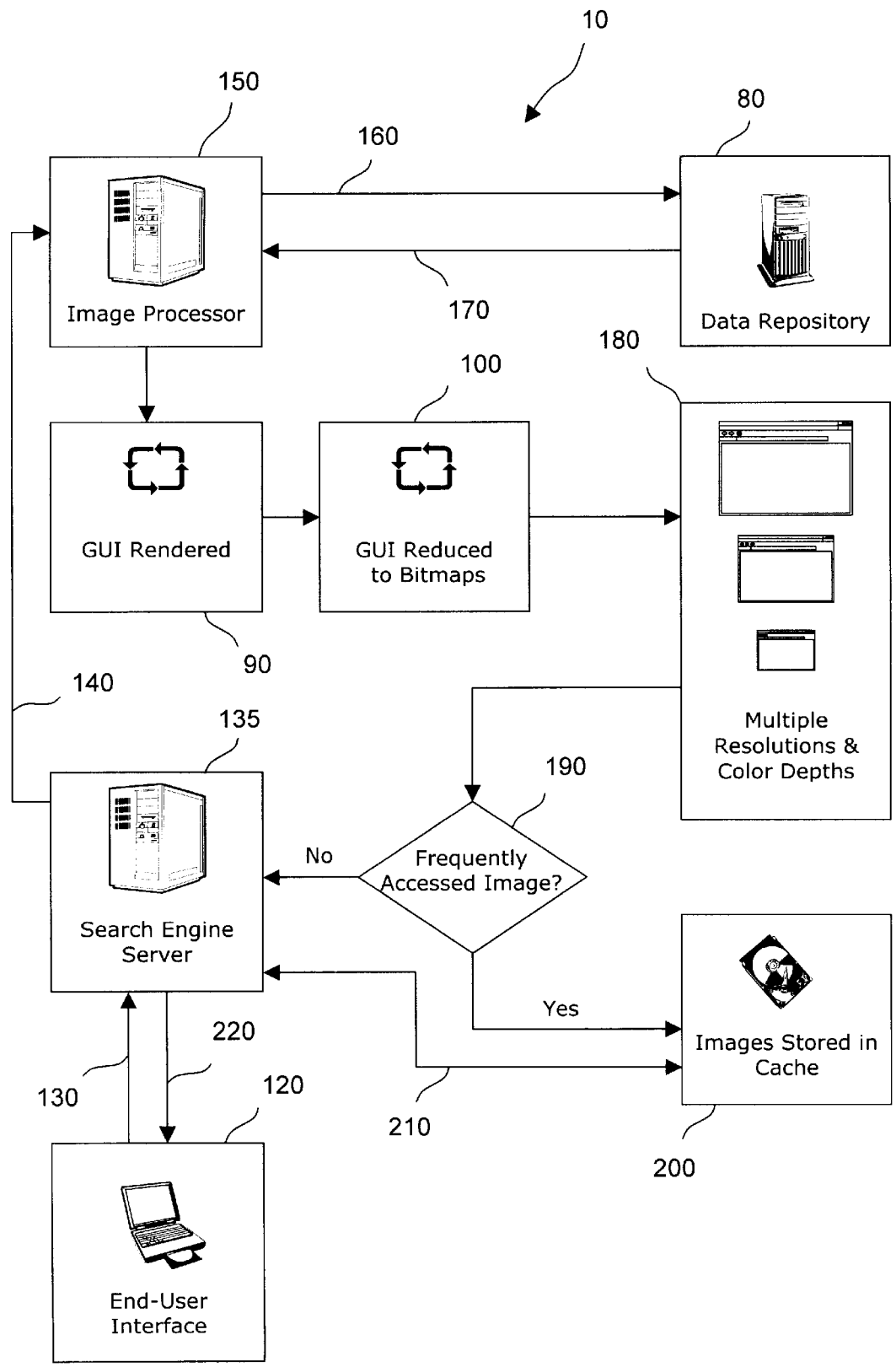
FIG. 3 is a diagrammatic view of a preferred embodiment of the invention.

FIG. 3 illustrates the method in greater detail wherein an end-user browser 120 sends a search request 130 to a search engine server 135. The search engine server 135 then searches a content index to find data depositories 80 that contain the desired content of the search request 130. Upon resolving at least one or more target data depositories 80 to present to the user, the search engine server 135 first performs a cache query 210 to an image cache 200 in order to determine if a target data depository 80 resolved in the search had been imaged and stored in the image cache 200 previously. If so, the search engine server 135 simply retrieves the display image 100 and transmits the same to the end-user interface 120. However, if the image 100 does not yet reside on the image cache 200, then another workflow is performed.

The search engine server 135 performs an image request 140 to an image processor 150, passing on the uniform resource locator string 50 of the data depository 80 graphic user interface needed. The image processor 150 may be one or more separate CPU devices or may be an application residing on the search engine server 135. The image processor 150 sends a request 160 to the data depository 80 in much the same way in which the end-user interface could directly send a request. The data repository 80 sends back text and image data 170 to the image processor which, in turn, renders 90 the same graphic user interface layout that would be displayed on the end-user interface 120. The graphic user interface is then reduced to a bitmap image 100 and converted to multiple color depths and resolutions 180. A caching algorithm 190 is applied to determine whether this bitmap image 100 is expected to be requested frequently. If the answer is yes, the bitmap image 100 is stored in the image cache 200. If the answer is no, the bitmap image 100 is simply passed to the search engine server 135 in random access memory and transmitted 220 to the end-user interface.

Figure 4:
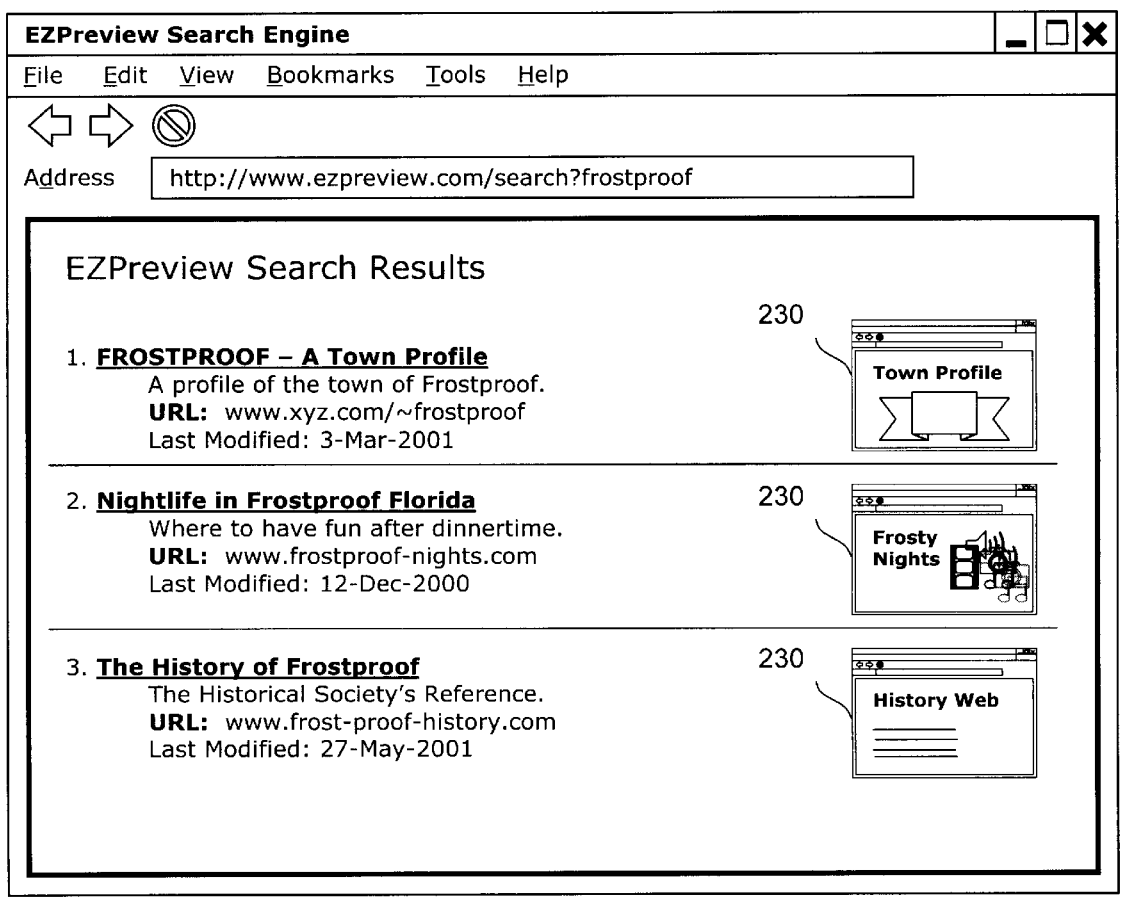
FIG. 4 is an exemplary screen display of the search result image display according to the invention.

FIG. 4 illustrates an exemplary screen display of search results as displayed on the end-user interface 120. At least one or more displayed bitmap images 230 are presented to the end-user along with the traditional text information of the prior art search engines.

Figure 5:
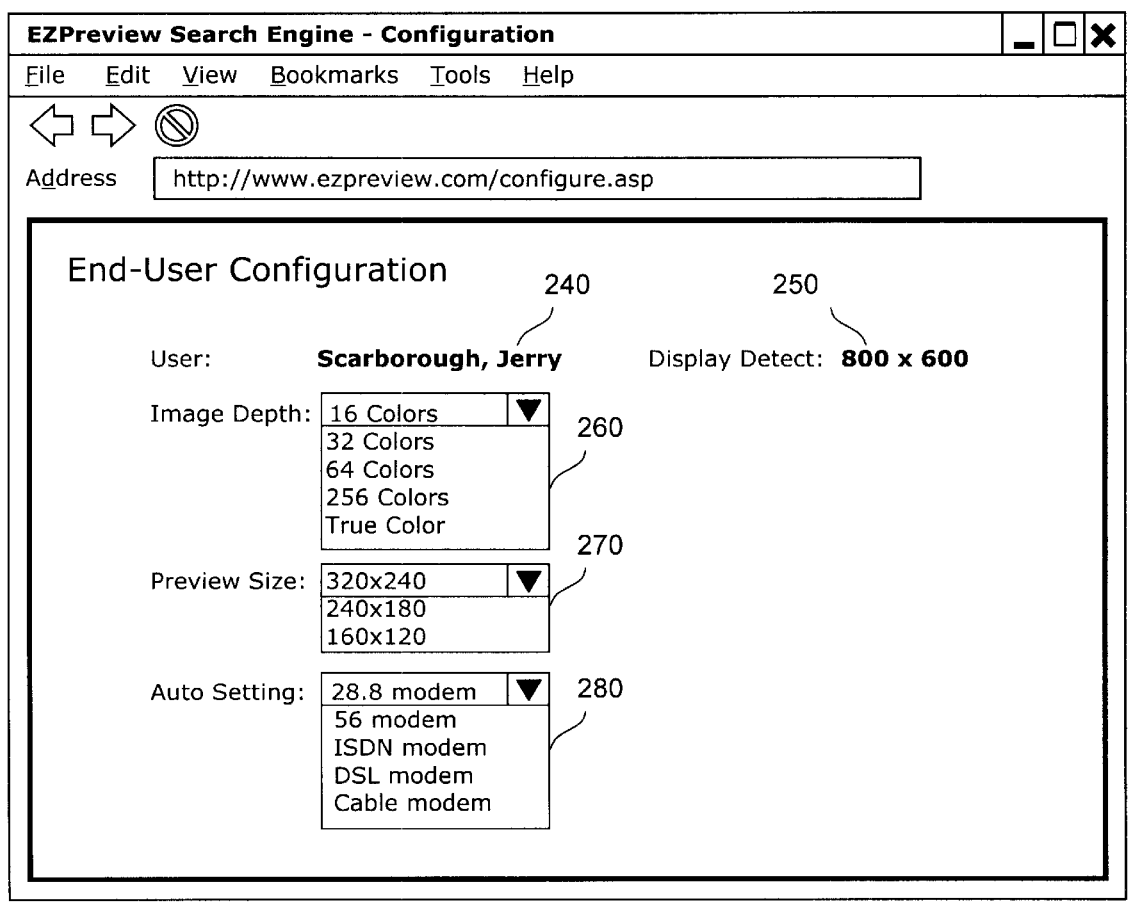
FIG. 5 is an exemplary screen display of an end-user configuration interface for adjusting the settings of the image displays.

FIG. 5 illustrates an exemplary screen display of an end-user configuration screen for adjusting color depth and image display resolution. User information 240 may be displayed as a result of data residing throughout the session, on client-side cookies or in a database table. End-user resolution information 250 can be retrieved from the server by values passed on by the end-user's web browser. Detecting the end-user's resolution is useful when designing the website to present information in the most optimal fashion. Drop down form fields are provided for end-user image color depth configuration 260 and end-user image preview size configuration 270. Alternatively, end-users may wish to have the system apply intelligent choices for them depending on how fast their network connection is. For example, an end-user auto bandwith setting 280 is provided with a drop down form field representing a plurality of network connection means. The slowest connection listed is 28.8 kps. Should this value be selected, image depth would be adjusted to 16 colors and preview size adjusted to 160×120. These adjustments would permit the end-user to view the display image results relatively quickly for such a slow connection. However, this comes with a price as the depth and richness of color, and the quality of the image suffers. In most cases, a cable modem will be one of the fastest connections available to most end-users. Should the cable modem be selected from the drop down form field, image depth and resolution may be automatically adjusted to high values.

Figure 6:
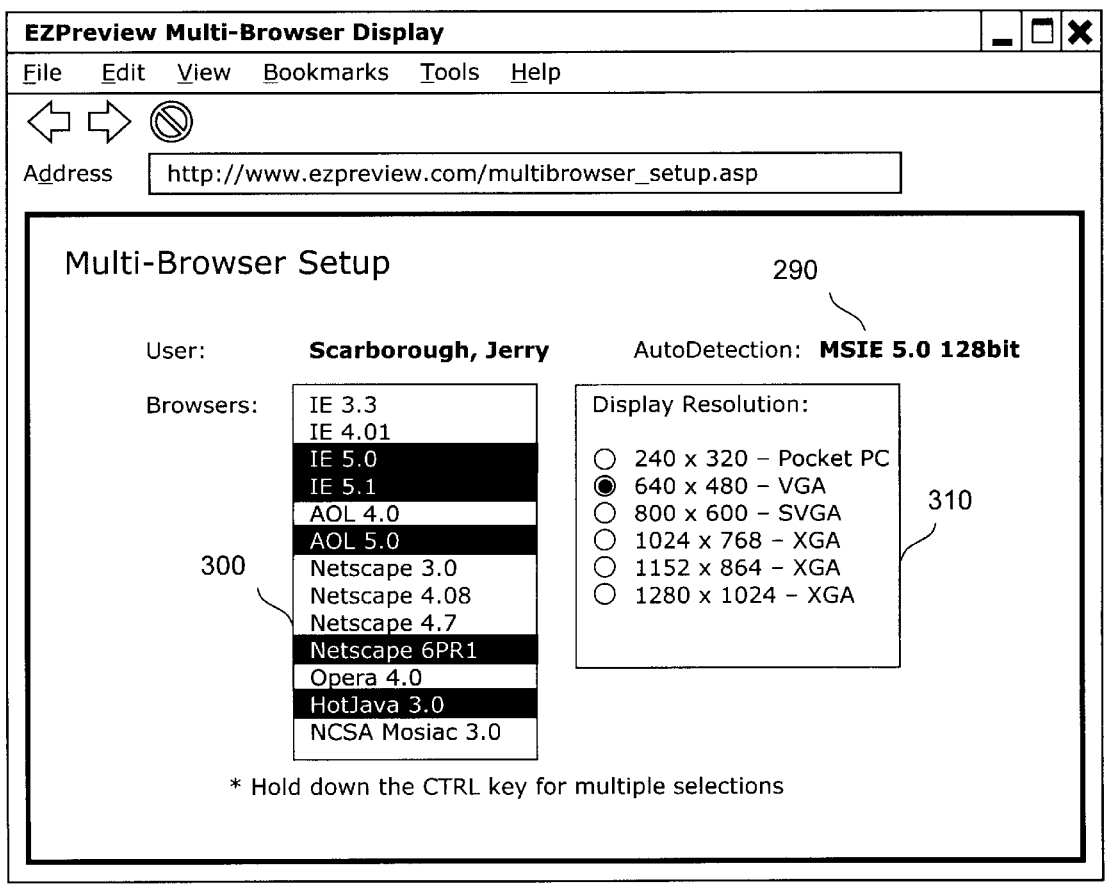
FIG. 6 is an exemplary screen display of a browser emulation setup for selecting browser emulations and display resolution emulations.
Figure 7:
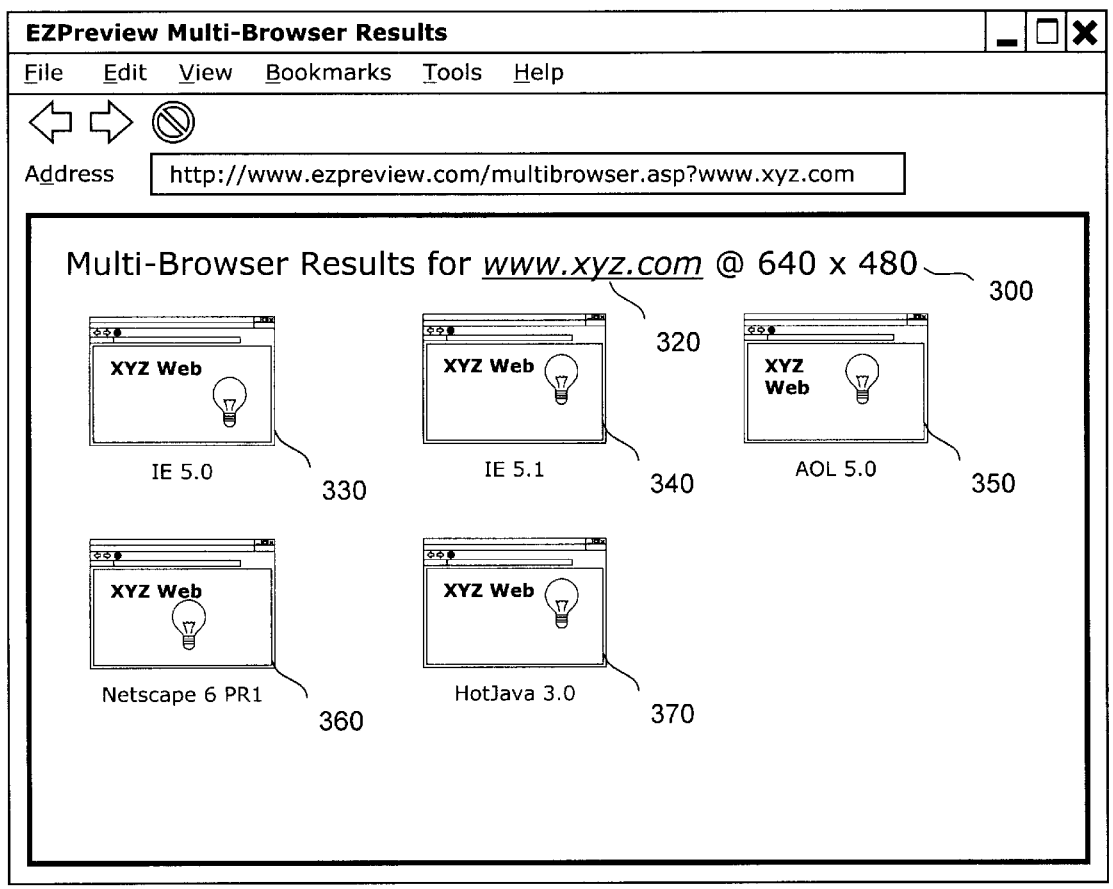
FIG. 7 is an exemplary screen display of the browser emulation display results illustrating the comparative formatting of five browser versions.

FIG. 6 shows a multi-browser display screen. A string list of popular web browser versions 300 is presented to the end-user who may select one or multiple browser emulations. The end-user's own browser identification 290 may be obtained by the search engine server 135 and passed back to the end-user interface 120. In addition to selecting one or more browser emulations 300, the end-user may also select from a predefined list of display resolutions 310. Once these settings are activated, FIG. 7 shown the results of a data depository 80 having an uniform resource locator 320 at 640 pixels wide by 480 pixels in height resolution 300. The results are displayed as emulations for Microsoft Internet Explorer Version 5.0 330, Microsoft Internet Explorer Version 5.1 340, America Online Browser Version 5.0 350, Netscape Browser Version 6PR1 360 and the HotJava Browser Version 3.0 370.

Figure 8:
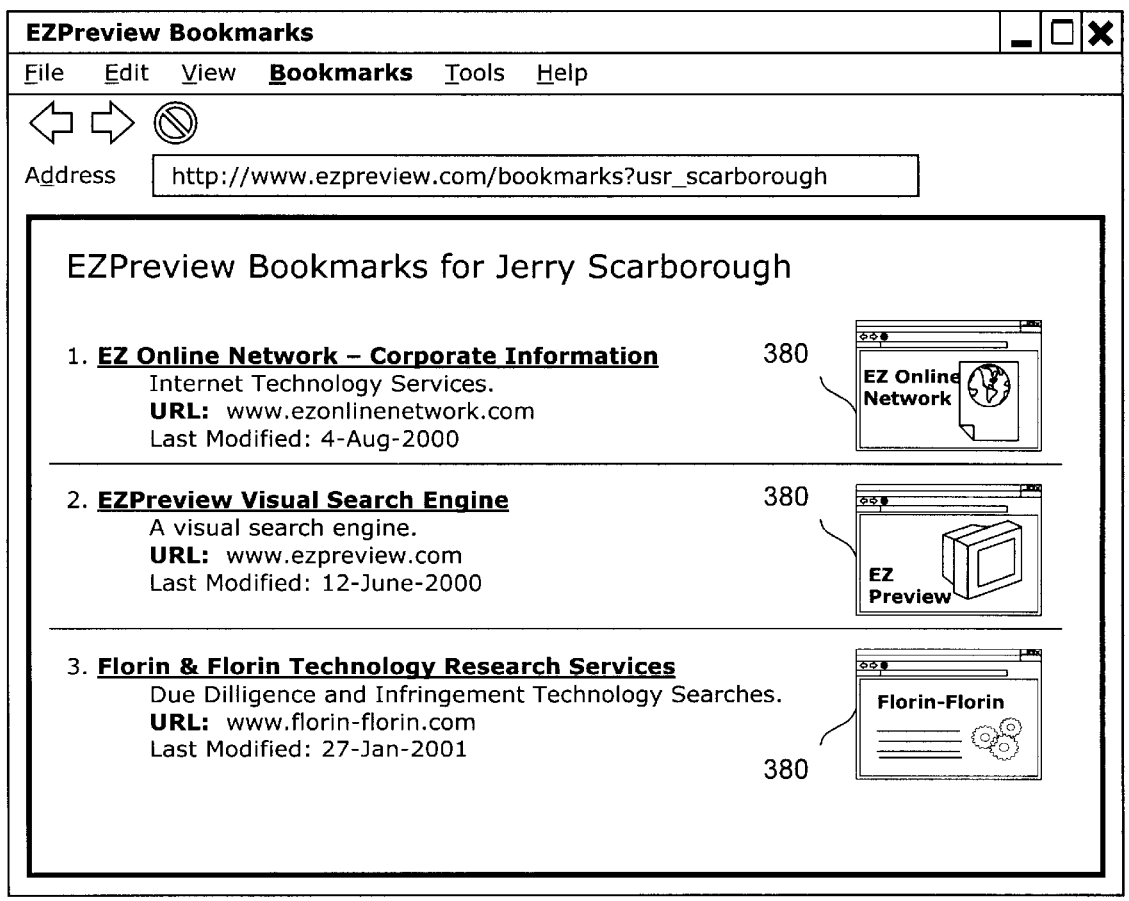
FIG. 8 is an exemplary screen display of a bookmark image display according to the invention.
Figure 9:
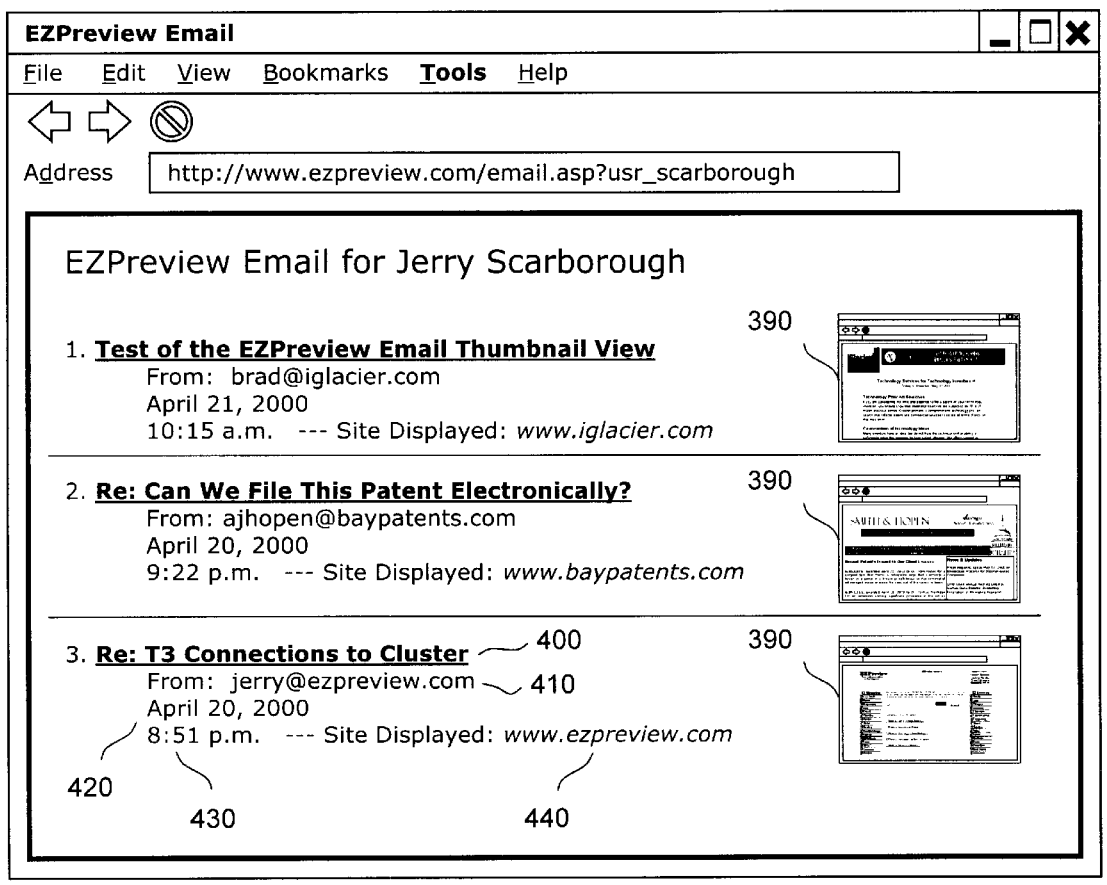
FIG. 9 is an exemplary screen display of an electronic mail image display utilizing the second-level domain name of the sender to display a website image of that second-level domain name website.

In FIG. 8, book-marked websites are not only displayed as linked text, but also as image displays 380 of the graphic user interface of the corresponding website. In FIG. 9, second-level sender domain graphic user interface images 390 are displayed in association with traditional electronic mail text such as an email subject string 400, a sender email string 410, a date received email string 420, and a time received email string 430. In a preferred embodiment of the invention, the uniform resource locator 440 of the second-level sender domain website is also displayed in text format.

Figure 10:
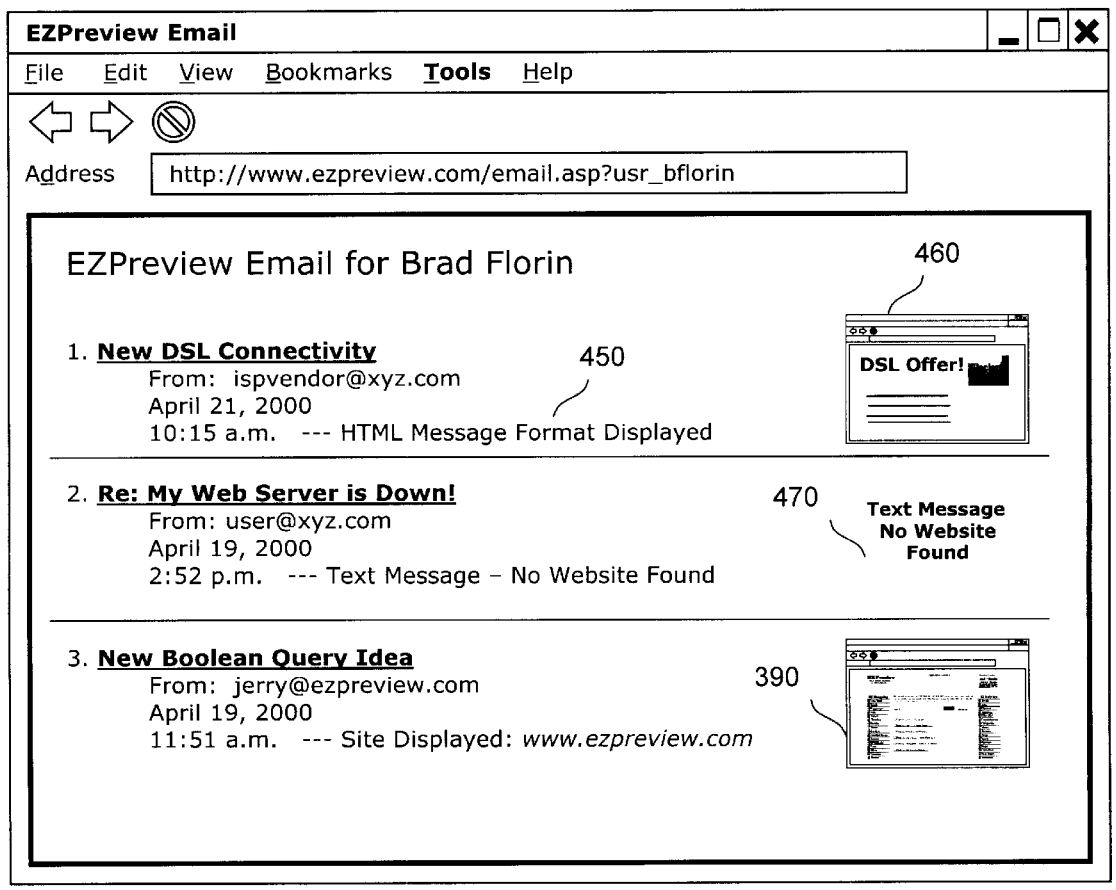
FIG. 10 is an exemplary screen display of an electronic mail image display dynamically detecting the formatting in the body of the electronic mail.

FIG. 10 illustrates an alternative embodiment of the invention wherein the body of the email is scanned for formatting which may include hypertext markup language, Extensible Markup Language, rich text, or the like. In this example, hypertext markup language is detected 450 and the resultant graphic user interface of the electronic email body is rendered as a hypertext markup language message image display 460. However, should no formatting be found in the message body and no website found at the sender's second level domain name, an error message 470 is generated and displayed to the end user.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method of displaying graphic user interface layouts comprising the steps of:
   a. accessing a data repository storing an email associated to an end-user, said email having a sender email address;
   b. accessing a data repository storing an instruction set for constructing a graphic user interface layout through a network connection directed to the second-level domain name of said sender email address;
   c. reducing said graphic user interface layout to a bitmap image;
   d. associating said email with said bitmap image; and
   e. displaying said bitmap image.

2. The method of claim 1 wherein step a. Further comprises said email having a subject string and displaying said subject string with said bitmap image in step e.

3. The method of claim 1 wherein step e. further comprises the step of displaying said sender email address with said bitmap image.

4. The method of claim 1 wherein step a. further comprises said email having a received time-date string and displaying said time-date string with said bitmap image in step e.

5. The method of claim 1 wherein said instruction set contains one or more hypertext markup language tags.

6. The method of claim 1 wherein said instruction set contains one or more rich text format tags.

7. The method of claim 1 wherein said instruction set contains one or more image references.

* * * * *